(12) United States Patent
Otani et al.

(10) Patent No.: US 9,623,502 B2
(45) Date of Patent: Apr. 18, 2017

(54) GEAR MACHINING DEVICE AND GEAR MACHINING METHOD

(71) Applicant: JTEKT Corporation, Osaka-shi (JP)

(72) Inventors: Hisashi Otani, Anjo (JP); Kichiji Takeshita, Anjo (JP); Hiroyuki Nakano, Tokai (JP); Lin Zhang, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/919,946

(22) Filed: Oct. 22, 2015

(65) Prior Publication Data

US 2016/0129511 A1    May 12, 2016

(30) Foreign Application Priority Data

Nov. 7, 2014   (JP) ................ 2014-226843
Nov. 7, 2014   (JP) ................ 2014-226844
Oct. 19, 2015  (JP) ................ 2015-205565
Oct. 19, 2015  (JP) ................ 2015-205566

(51) Int. Cl.
  *B23F 23/08*   (2006.01)
  *B24B 37/013*  (2012.01)
  *B23F 1/06*    (2006.01)

(52) U.S. Cl.
  CPC ............. *B23F 23/085* (2013.01); *B23F 1/06* (2013.01)

(58) Field of Classification Search
  CPC ....... B23F 23/02–23/06; B23F 23/1225; B23F 5/02; B23F 19/04; B23F 19/05; B23F 9/025; B23F 23/085; Y10T 409/100159; Y10T 409/10954; Y10T 409/109699; G05B 19/186
  USPC ................. 451/5, 47; 409/6, 61–62
  See application file for complete search history.

(56) References Cited

U.S. PATENT DOCUMENTS

| | | | | |
|---|---|---|---|---|
| 4,372,085 A | * | 2/1983 | Wiener | B23F 1/02 451/403 |
| 4,467,568 A | * | 8/1984 | Bloch | B23F 5/06 451/147 |
| 4,630,402 A | * | 12/1986 | Erhardt | B23F 19/052 451/253 |

(Continued)

FOREIGN PATENT DOCUMENTS

| | | |
|---|---|---|
| JP | 1-159126 | 6/1989 |
| JP | 2005-335061 | 12/2005 |
| JP | 4468632 | 5/2010 |

*Primary Examiner* — George Nguyen
(74) *Attorney, Agent, or Firm* — Oblon, McClelland, Maier & Neustadt, L.L.P.

(57) ABSTRACT

A gear machining device for machining a gear by using a machining tool which has a rotation axis inclined relative to a rotation axis of a workpiece and feeding the machining tool relatively in the rotation axis direction of the workpiece by rotating the machining tool in synchronization with a rotation of the workpiece. The gear machining device includes a tool state memorizing portion for memorizing a tool state including a position or a posture of the machining tool relative to the workpiece for machining a tooth bottom, first and second side surfaces of the gear and a machining control portion for controlling machining of the workpiece under each tool state of the machining tool memorized in the tool state memorizing portion.

11 Claims, 13 Drawing Sheets

(56) References Cited

U.S. PATENT DOCUMENTS

| | | | | |
|---|---|---|---|---|
| 4,694,617 | A * | 9/1987 | Loos | B23F 19/055 409/12 |
| 4,815,239 | A * | 3/1989 | Sommer | B23F 5/00 451/10 |
| 4,910,922 | A * | 3/1990 | Kotthaus | B23F 17/001 409/29 |
| 4,947,590 | A * | 8/1990 | Schapp | B23F 19/007 409/32 |
| 5,260,879 | A * | 11/1993 | Sasaki | B23F 23/006 409/2 |
| 5,765,974 | A * | 6/1998 | Faulstich | B23F 17/00 409/38 |
| 5,899,645 | A * | 5/1999 | Garschagen | B23F 19/105 409/9 |
| 7,465,131 | B2 * | 12/2008 | Haas | B23F 5/16 409/2 |
| 8,118,522 | B2 * | 2/2012 | Nakajima | B23C 3/12 269/59 |
| 2003/0113177 | A1 | 6/2003 | Fahrer et al. | |
| 2005/0266774 | A1 | 12/2005 | Baldeck | |
| 2008/0254716 | A1 | 10/2008 | Baldeck | |

* cited by examiner

GEAR MACHINING DEVICE AND GEAR MACHINING METHOD

INCORPORATION BY REFERENCE

This application is based on and claims priority under 35 U.S.C. 119 with respect to Japanese Applications No. 2014-226843 and No. 2014-226844 both filed on Nov. 7, 2014, and Japanese Applications No. 2015-205565 and No. 2015-205566 both fled on Oct. 19, 2015, the entire content of which is incorporated herein by reference.

BACKGROUND OF THE INVENTION

Field of the Invention

This invention relates to a gear machining device and a gear machining method for machining a gear by cutting machining by synchronizing a rotation of a machining tool with a rotation of a workpiece to be machined.

Description of Related Arts

As an effective measure for machining both internal and external teeth by cutting machining, a machining device disclosed in a Patent Document 1 (JPH01-159126 A) may be exampled. The machining device according to this conventional technology produces gear teeth by cutting with synchronized rotations of a workpiece and a machining tool with high speeds, feeding the machining tool in a rotation axis direction of the workpiece. The workpiece is rotatable about a rotation axis and the machining tool is, for example, a cutter with a plurality of cutting blade portions, which is rotatable about a rotation axis inclined with a predetermined angle relative to the rotation axis of the workpiece, i.e., rotatable about a rotation axis having an intersecting angle relative to the rotation axis of the workpiece.

However, according to the conventional machining device, since the plurality of cutting blade portions contacts with the workpiece at the same time, the cutting resistance tends to be increasing which may generate self-induced vibrations upon cutting operation. This may worsen the tooth trace accuracy (generation of waviness of the tooth trace). As a countermeasure to this, the diameter of the machining tool may be lessened to reduce the number of contacts of the blade portions with the workpiece. However, in such case, the rigidity of the machining tool may be deteriorated.

Accordingly, in order to overcome such issues, a machining method has been proposed in a Patent Document 2 (JP2005-335061 A), wherein the machining tool is moved relative to the workpiece with a variable feeding speed in a feeding route direction along the tooth surface. According to this machining method, since the interval between fine machining scratches becomes irregular along the surface of each tooth, it is possible to reduce noise generated upon meshing between the machining tool and the workpiece, that is, self-induced vibrations during cutting. Further, a Patent Document 3 (JP4468632 B) discloses a setting method of the intersecting angle by determining the position and the rotational angle of the machining tool for producing the internal gear teeth by machining.

DISCLOSURE OF INVENTION

Problems to be Solved by the Invention

However, in case of the machining method as disclosed in the Patent Document 2, it is necessary to change the feeding speed of the machining tool relative to the workpiece, the feeding control method becomes complicated and accordingly, it becomes difficult to obtain a tooth profile of the gear with a high degree of accuracy. In addition, the blades of the machining tool for machining according to this machining device are formed to have the same profile with the profile of tooth of a gear to be machined at the end surface of the machining tool. It is noted here that when the edges of the blades are worn out, such blades are usually re-used after removing the worn edges by grinding the blades. However, when a total amount removed by grinding exceeds a pre-set amount, the profile of the blade portion becomes misshapen, to thereby generate an issue of deterioration of the machining precision.

The present invention has the following two objectives and the first object is to provide a gear machining device and a gear machining method for machining a high precision gear by cutting with synchronized rotations of a machining tool and a workpiece to be machined. Considering the above issue, the second object of the invention is to provide a gear machining device and a gear machining method, wherein a machining precision upon machining of a gear by cutting, using a machining tool which is formed with machining blades at an end surface of the machining tool is kept to a high degree of accuracy for over a long life time.

Means to Solve the Problems

According to a first aspect of the invention, there is provided a gear machining device for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece. The gear machining device includes a tool state memorizing portion for memorizing a tool states each including a position or a posture of the machining tool relative to the workpiece and obtained based on a profile of the machining tool, which includes a tooth bottom tool state memorizing portion for memorizing a tooth bottom tool state for machining the tooth bottom between adjacent teeth of the gear, a first side surface tool state memorizing portion for memorizing a first side surface tool state of the machining tool for machining a first side surface of one of the adjacent teeth facing the tooth bottom and a second side surface tool state memorizing portion for memorizing a second side surface tool state of the machining tool for machining a second side surface of the other of the adjacent teeth facing the tooth bottom, and a machining control portion for controlling machining of the tooth bottoms, the first side surfaces, and the second side surfaces under respective tool states of the machining tool memorized in the tooth bottom tool state memorizing portion, the first side surface tool state memorizing portion and the second side surface tool state memorizing portion.

According to the above structure, since the tooth bottoms, the first side surfaces and the second side surfaces of teeth of a gear can be machined separately in sequence, the respective blade of the machining tool is used for cutting only a portion of the tooth. This can reduce the cutting resistance and accordingly, the generation of the self-induced vibrations, to thereby improve the tooth trace accuracy (reduction of waviness of the tooth trace) of a gear.

According to a second aspect of the invention, a gear machining device machines tooth bottoms and first and second side surfaces of a gear by using a machining tool which has a rotation axis inclined relative to a rotation axis of a workpiece and feeding the machining tool relatively in a rotation axis direction of the workpiece by rotating the machining tool in synchronization with a rotation of the workpiece. A profile of the tool end surface of the machining tool before grinding of blades of the machining tool is different from the profile of the tool end surface of the machining tool after grinding thereof. The gear machining device according to this aspect of the invention includes a tool state memorizing portion for memorizing tool states each including a position or a posture of a machining tool relative to the workpiece and obtained based on profiles of the tool end surface of the machining tool before and after the grinding and a machining control portion which controls machining of the tooth bottoms, the first side surfaces and the second side surfaces before grinding the blades of the machining tool, under respective tool states of the machining tool before the grinding memorized in the tool state memorizing portion and controls machining of the tooth bottoms, the first side surfaces and the second side surfaces after grinding the blades of the machining tool, under the tool states of the machining tool after the grinding memorized in the tool state memorizing portion.

According to the structure of the second aspect of the invention, the optimum tool states of the machining tool before and after the grinding thereof can be obtained. Therefore, even the number of grinding time is increased, the accuracy of machining can be maintained and the duration of life of the machining tool can be improved. At the same time, a highly precise gear with low in cost can be produced.

According to one aspect of gear machining method of the invention, there is provided a gear machining method for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece. The method includes a tooth bottom tool state calculating process for calculating a tool state including a position or a posture of the machining tool relative to the workpiece for machining the tooth bottom between adjacent teeth of the gear, a first side surface tool state calculating process for calculating a first side surface tool state including a position or a posture of the machining tool relative to the workpiece for machining the first side surface of one of the adjacent teeth facing the tooth bottom, a second side surface tool state calculating process for calculating a second side surface tool state including a position or a posture of the machining tool relative to the workpiece for machining the second side surface of the other of the adjacent teeth facing the tooth bottom, and a machining controlling process for controlling machining of the tooth bottoms, the first side surfaces and the second side surfaces under respective tool states of the machining tool calculated in the tooth bottom tool state calculating process, the first side surface tool state calculating process and the second side surface tool state calculating process, respectively.

According to the above method, since the tooth bottoms, the first side surfaces and the second side surfaces of the teeth of the gear can be machined separately in sequence, the blades of the machining tool are used for cutting only a portion of the tooth. This can reduce the cutting resistance and accordingly, the generation of the self-induced vibrations to thereby improve the tooth trace accuracy (reduction of waviness of the tooth trace) of the gear.

According to another aspect of the invention, there is provided a gear machining method for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece, wherein a profile of a tool and surface of the machining tool before grinding of blades of the machining tool is different from a profile of the tool end surface of the machining tool after grinding thereof. The method includes a tooth bottom tool state calculating process for calculating a tooth bottom tool state including a position or a posture of the machining tool relative to the workpiece for machining the tooth bottom between adjacent teeth of the gear based on the respective profiles of the tool end surface of the machining tool before and after the grinding, a first side surface tool state calculating process for calculating a first side surface tool state including a position or a posture of the machining tool relative to the workpiece for machining the first side surface of one of the adjacent teeth facing the tooth bottom based on the respective profiles of the tool end surface of the machining tool before and after the grinding, a second side surface tool state calculating process for calculating a second side surface tool state including a position or a posture of the machining tool relative to the workpiece for machining the second side surface of the other of the adjacent teeth facing the tooth bottom based on the respective profiles of the tool end surface of the machining tool before and after the grinding, and a machining controlling process for controlling machining of the tooth bottoms, the first side surfaces and the second side surfaces before grinding the blades of the machining tool, under the respective tool states of the machining tool calculated based on the profile of the tool end surface of the machining tool before the grinding in the tooth bottom tool state calculating process, the first side surface tool state calculating process and the second side surface tool state calculating process, and for controlling machining of the tooth bottoms, the first side surfaces and the second side surfaces after grinding the blades of the machining tool, under the respective tool states of the machining tool calculated based on the profile of the tool end surface of the machining tool after the grinding in the tooth bottom tool state calculating process, the first side surface tool state calculating process and the second side surface tool state calculating process.

According to the method of another aspect of the invention, the optimum tool states of the machining tool before and after the grinding can be obtained. Therefore, even the number of grinding time is increased, the accuracy of machining can be maintained and the duration of life of the machining tool can be improved. At the same time, a highly precise gear with low in cost can be produced.

BRIEF DESCRIPTION OF THE ATTACHED DRAWINGS

Various aspects of this invention will become apparent to those skilled in the art from the following detailed description of the preferred embodiments, when read in light of the accompanying drawings, in which.

Figure 1A:
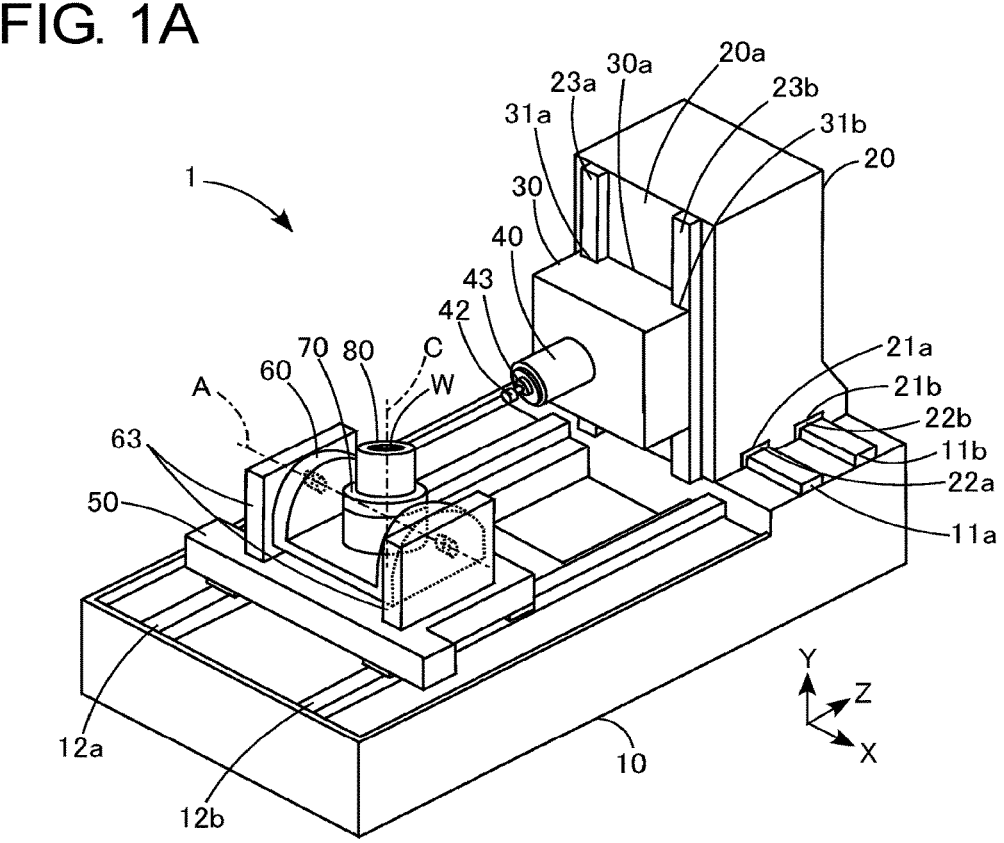
FIG. 1A is a perspective view of the entire structure of the gear machining device according to an embodiment of the invention.
Figure 1B:
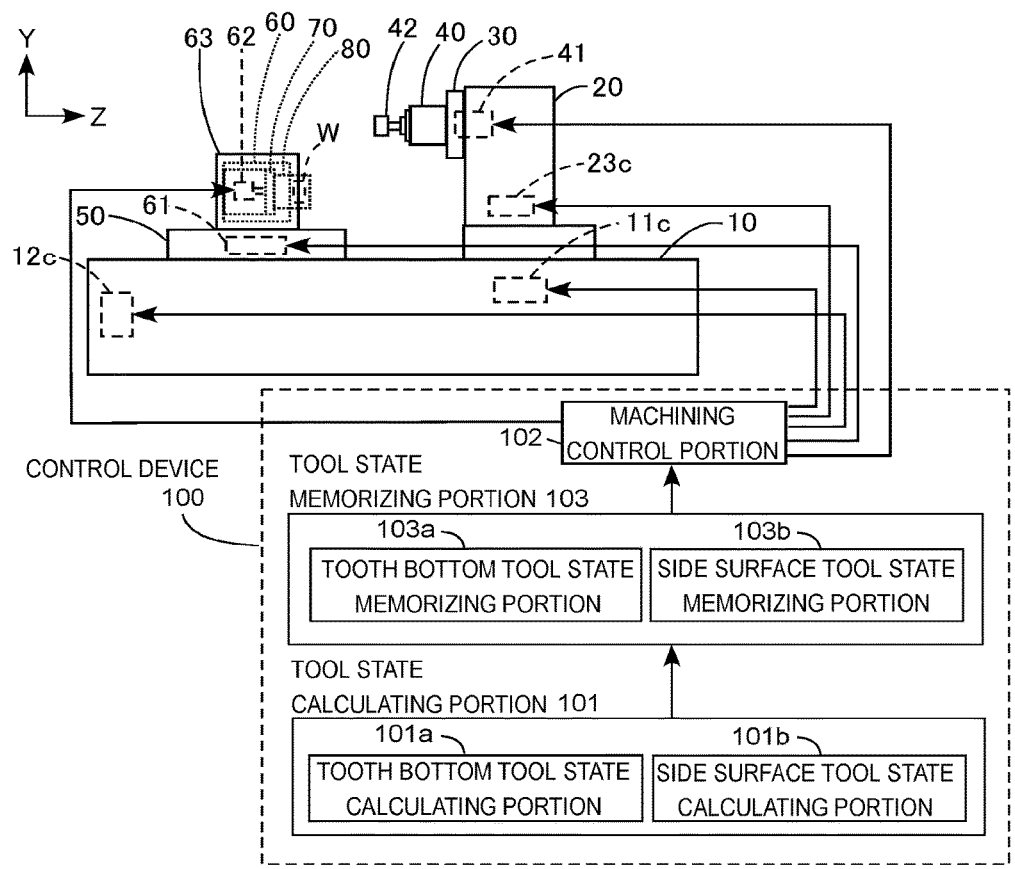
FIG. 1B is a view showing an outline structure of the gear machining device shown in FIG. 1A and a control device.
Figure 5A:
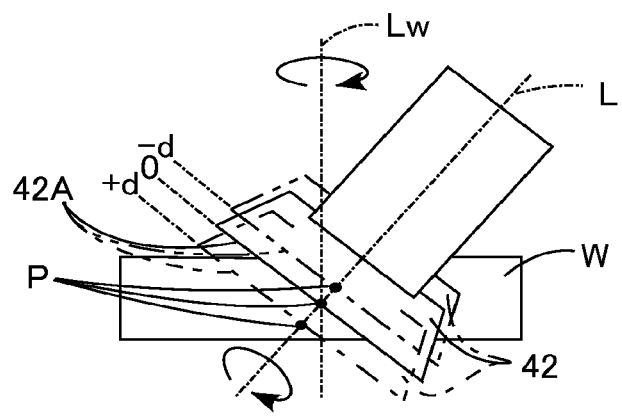
Figure 5B:
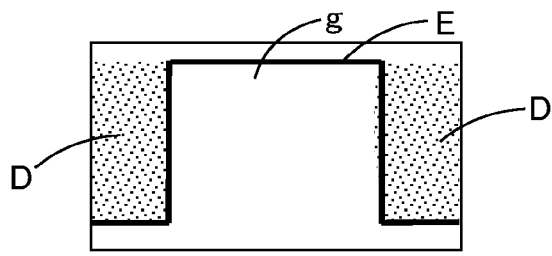
Figure 5C:
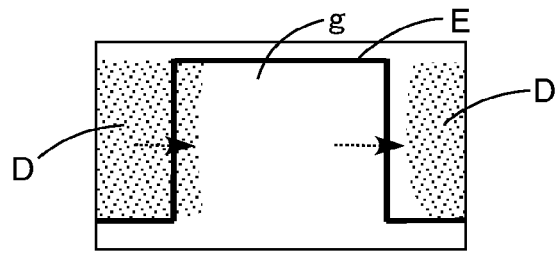
Figure 5D:
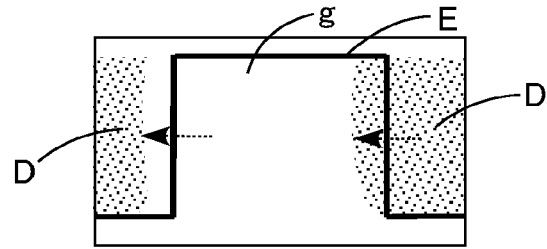
Figure 6A:
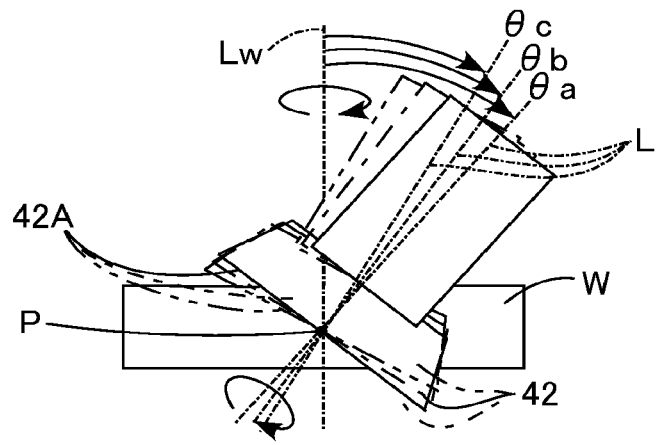
Figure 6B:
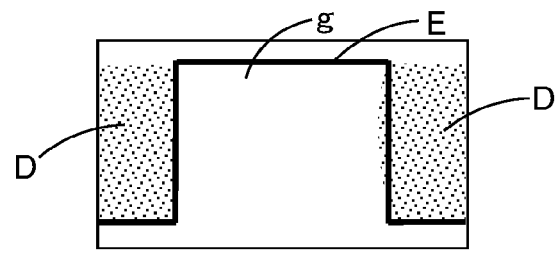
Figure 6C:
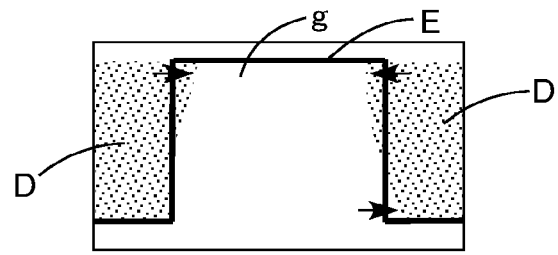
Figure 6D:
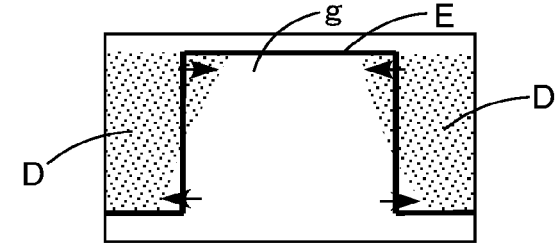
Figure 7A:
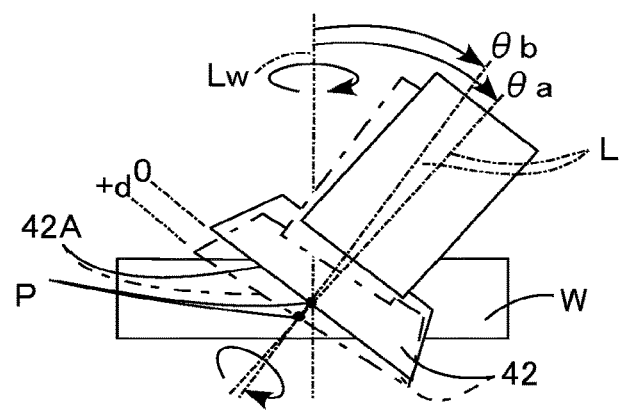
Figure 7B:
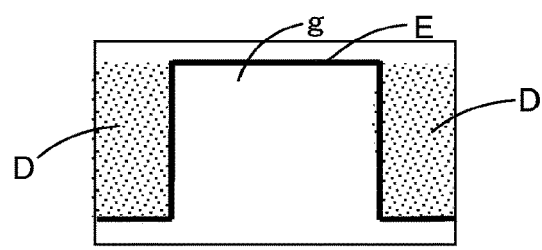
Figure 7C:
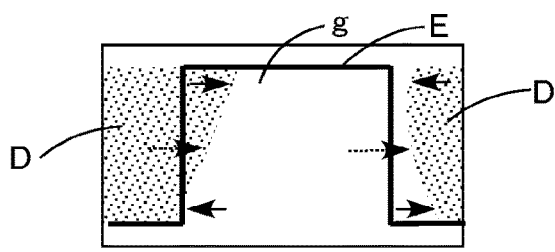
Figure 8:
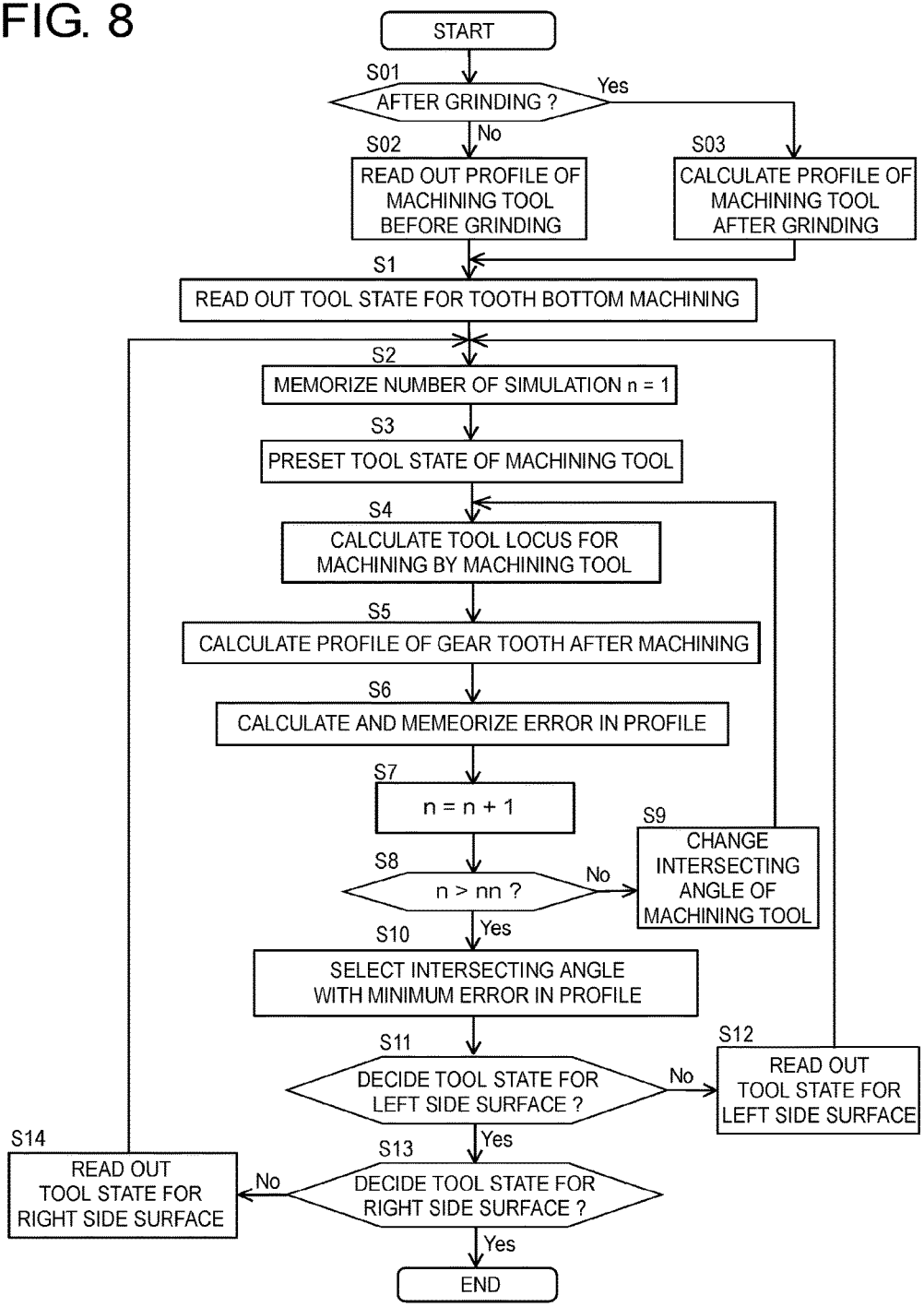
Figure 9A:
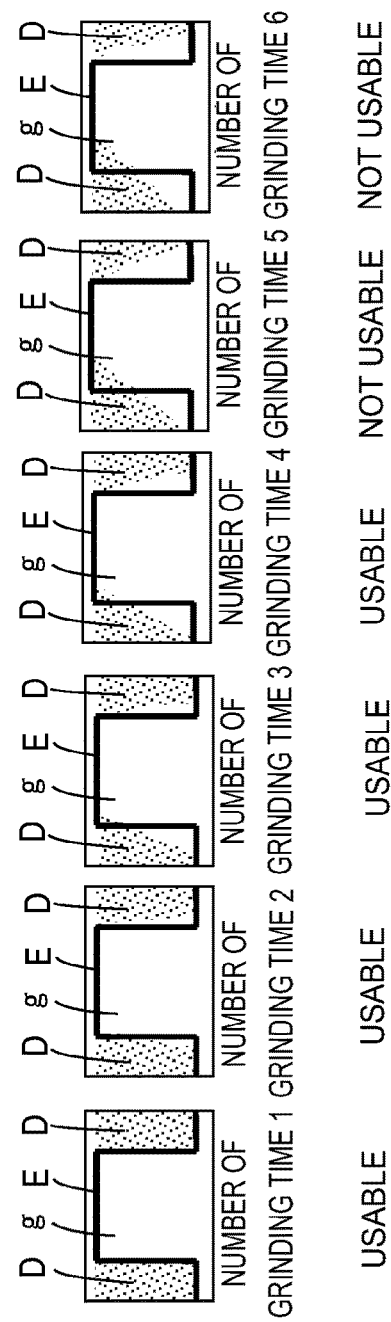
Figure 9B:
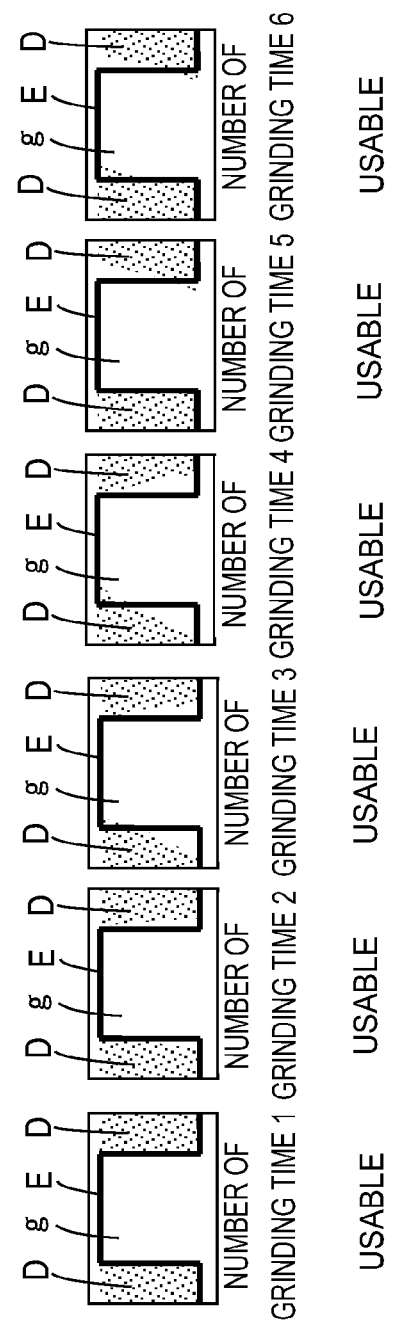
Figure 10A:
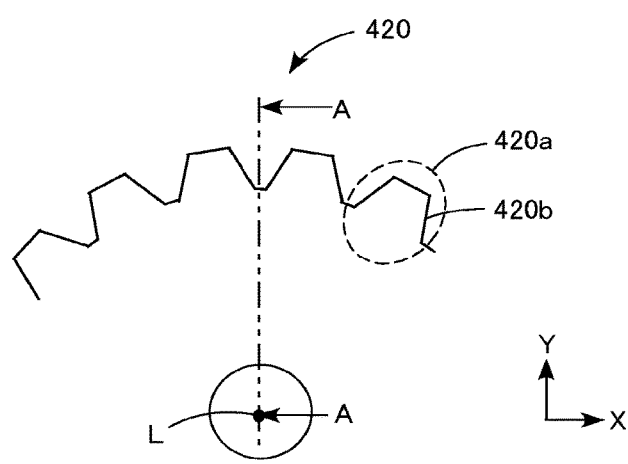
Figure 10B:
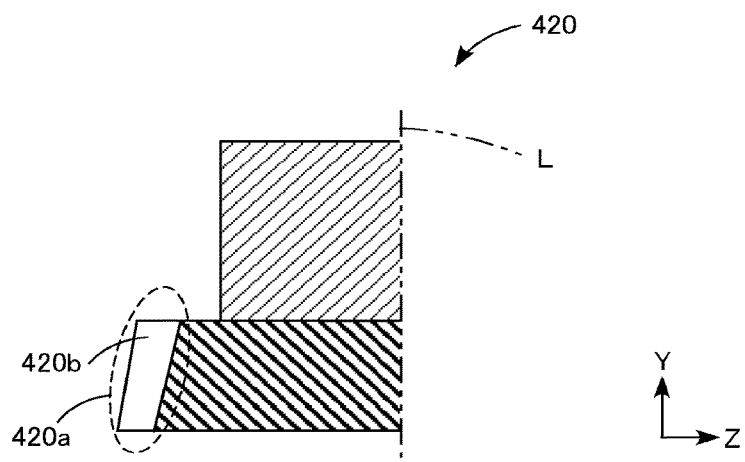
Figure 11:
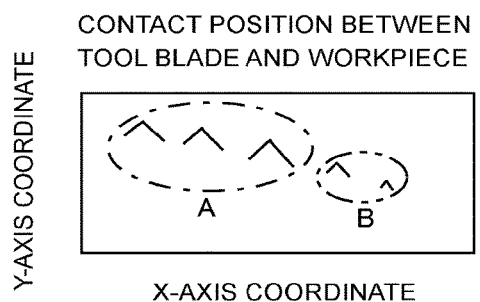
Figure 12:
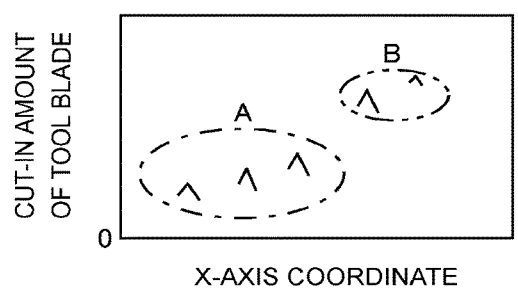
Figure 13:
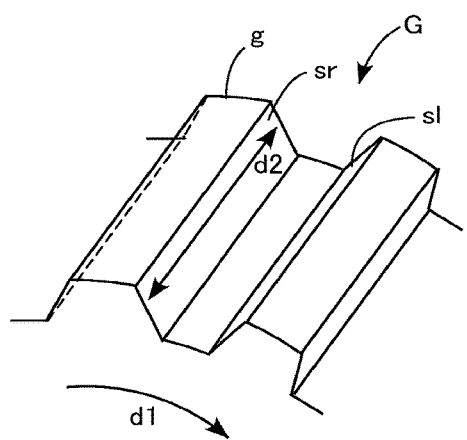

FIG. 5A indicates a relative position between the workpiece and the machining tool when a tool position in a rotation axis direction of the machining tool is changed;

FIG. 5B is a first view of a machining state when the tool position in the axial direction thereof is changed;

FIG. 5C is a second view of a machining state when the tool position in the axial direction thereof is changed;

FIG. 5D is a third view of a machining state when the tool position in the axial direction thereof is changed;

FIG. 6A indicates a relative position between the workpiece and the machining tool when an intersecting angle indicating an inclination angle of the rotation axis of the machining tool relative to the rotation axis of the workpiece is changed;

FIG. 6B is a first view of a machining state when the intersecting angle is changed;

FIG. 6C is a second view of a machining state when the intersecting angle is changed;

FIG. 6D is a third view of a machining state when the intersecting angle is changed;

FIG. 7A indicates a relative position between the workpiece and the machining tool when the position in the rotation axis direction and the intersecting angle of the machining tool are changed;

FIG. 7B is a first view of a machining state when the position in the axial direction and the intersecting angle of the machining tool are changed;

FIG. 7C is a second view of a machining state when the position in the axial direction and the intersecting angle of the machining tool are changed;

FIG. 8 is a flowchart showing another processing of the control device shown in FIG. 1B;

FIG. 9A is a view showing several machining states machined by a conventional machining tool at intervals of grinding thereof;

FIG. 9B is a view showing several machining states machined by a machining tool of the embodiment of the invention at intervals of grinding thereof;

FIG. 10A is a view of the conventional machining tool seen from the tool end surface side in the direction of rotation axis thereof;

FIG. 10B is a cross sectional view of the conventional machining tool taken from the line A-A in FIG. 10A seen in a direction perpendicular to an axial direction;

FIG. 11 is a view showing contact positions of a plurality of blades of the machining tool with the workpiece in the Y-Y coordinates system in FIG. 10A at a moment when the workpiece is being machined by the plurality of blades of the machining tool of FIG. 10A, wherein five blades of the machining tool are in contact with the workpiece;

FIG. 12 is a view showing amount of depth of cut by the plurality of blades which are in contact with the workpiece as shown in FIG. 11, the amount of depth of cut being indicated with the vertical axis by agreeing the horizontal axis of FIG. 11 with the horizontal axis of FIG. 12; and FIG. 13 is a view for explaining an error of profile of a gear which corresponds to a tooth trace error of the gear.

DETAILED DESCRIPTION OF THE PREFERRED EMBODIMENTS OF THE INVENTION (Mechanical Structure of Gear Machining Device)

According to this embodiment, as an example of a gear machining device 1, a five-axis machining center is exampled and will be explained with reference to FIGS. 1A and 1B. In other words, the gear machining device 1 includes mutually intersecting three linear axes (X, Y and Z axes) and two rotary axes (A and C axes) as the drive axes.

As shown in FIGS. 1A and 1B, the gear machining device 1 includes a bed 10, a column 20, a saddle 30, a rotary main spindle 40, a table 50, a tilt table 60, a turn table 70, a workpiece holder 80 and a control device 100, and so on. It is noted that although it is not shown in the drawings, but normally a known automatic machining tool exchange device is arranged alongside the bed 10.

The bed 10 is of approximately a rectangular shape and arranged on the floor. It is noted that the shape of the bed is not limited to the rectangular shape and any shape would be used therefor. A pair of X-axis guide rails 11a and 11b is arranged on an upper surface of the bed 10 and extends in an X-axis direction (horizontal direction) in parallel with each other and the column 20 is slidable along on the guide rails 11a and 11b. Further, an X-axis ball screw (not shown) is arranged on the bed 10 between the pair of X-axis guide rails 11a and 11b for driving the column 20 in the x-axis direction. An X-axis motor 11c (FIG. 1B) is provided for rotationally driving the X-axis ball screw.

A pair of X-axis guide grooves 21a and 21b is provided on the bottom surface of the column 20 extending in an X-axis direction and in mutually parallel with each other. The pair of X-axis guide rails 11a and 11b is inserted into the pair of X-axis grooves 21a and 21b through ball guides 22a and 22b so that the column 20 is movable in the X-axis direction relative to the bed 10. The bottom surface of the column 20 is in close contact with the upper surface of the bed 10.

Further, a pair of Y-axis guide rails 23a and 23b is arranged on aside surface (sliding surface) of the column 20 in parallel with the X-axis and extends in a Y-axis direction (vertical direction) in parallel with each other and the saddle 30 is arranged and is slidable along the Y-axis guide rails 23a and 23b. Further, a Y-axis ball screw (not shown) is arranged on the column 20 between the pair of Y-axis guide rails 23a and 23b for driving the saddle 30 in the Y-axis direction. A Y-axis motor 23c is provided for rotationally driving the Y-axis ball screw.

A pair of Y-axis guide grooves 31a and 31b is provided on the side surface 30a of the saddle 30 facing to the sliding surface 20a of the column 20, extending in a Y-axis direction and in mutually parallel with each other. The pair of Y-axis guide rails 23a and 23b is inserted into the pair of Y-axis guide grooves 31a and 31b so that the saddle 30 is movable in the Y-axis direction relative to the column 20. The side surface 30a of the saddle 30 is in close contact with the sliding surface 20a of the column 20.

The rotary main spindle 40 is rotatably supported in the saddle 30 and driven by the main spindle motor 41 which is accommodated in the saddle 30 and supports the machining tool 42 thereon. The machining tool 42 is supported by the tool holder 43 and fixed on the tip end of the rotary main spindle 40. The machining tool 42 is rotated in response to the rotation of the rotary main spindle 40. Further, the machining tool 42 is movable in an X-axis direction and a Y-axis direction relative to the bed 10 in response to the respective movements of the column 20 and the saddle 30. The detail of the structure of the machining tool 42 will be explained later.

Further, a pair of Z-axis guide rails 12a and 12b is arranged on an upper surface of the bed 10 in a Z-axis direction (horizontal direction) perpendicular to the X-axis direction in parallel with each other and the table 50 is slidable along the guide rails 12a and 12b. Further, a Z-axis ball screw (not shown) is arranged on the table 50 between the pair of Z-axis guide rails 12a and 12b for driving the table 50 in the Z-axis direction. A Z-axis motor 12c is provided for rotationally driving the Z-axis ball screw.

The table 50 is provided on the pair of Z-axis guide rails 12a and 12b to be able to move in a Z-axis direction relative to the bed 10. A pair of tilt table support portions 63 is provided on the upper surface of the table 50 for supporting the tilt table 60 and the tilt table 60 is provided on the tilt table support portions 63 to be able to rotate (swing) about an A-axis (horizontal direction). The tilt table 60 is driven (rotated) by an A-axis motor 61 which is accommodated in the table 50.

The turn table 70 is rotatably provided on the tilt table 60 about a C-axis which is right angles to the A-axis. A workpiece holder 80 for holding the workpiece W is provided at the turn table 70 and the turn table 70 is rotated by a C-axis motor 62 together with the workpiece W and the workpiece holder 80.

The control device 100 includes a tool state calculating portion 101, a tool state memorizing portion 103 and a machining control portion 102 etc. It is noted here that the tool state calculating portion 101 and the machining control portion 102 may be formed separately by individual hardware, respectively or may be structured so as to perform respective functions by using software.

Although the detail of the tool state calculating portion 101 will be explained later, it is noted here that the tool state calculating portion 101 basically includes a tooth bottom tool state calculating portion 101a which calculates a tool state including a position or a posture of the machining tool 42 relative to the workpiece W for machining tooth bottoms of teeth of a gear to be machined and a side surface tool state calculating portion 101b which calculates the tool state including a position or a posture of the machining tool 42 relative to the workpiece W for machining first and second side surfaces of the teeth of the gear to be machined.

The tool state memorizing portion 103 memorizes the tool states that are calculated by the tool state calculating portion 101, i.e., the tool state memorizing portion 103 includes a tooth bottom tool state memorizing portion which memorizes a tooth bottom tool state calculated by the tooth bottom tool state calculating portion 101a for machining the tooth bottom between adjacent teeth of the gear to be machined and a side surface tool state memorizing portion 103b which memorizes side surface tool states calculated by the side surface tool state calculating portion 101b for machining the respective side surfaces facing with each other of the adjacent teeth of the gear to be machined. The respective side surfaces will be referred to as first and second side surfaces hereinafter. It is noted that the side surface tool state memorizing portion 103b includes a first side surface tool state memorizing portion which memorizes a first side surface tool state of the machining tool 42 relative to the workpiece W for machining the first side surface of one of the adjacent teeth facing the tooth bottom and a second side surface tool state memorizing portion which memorizes a second side surface tool state of the machining tool 42 relative to the workpiece W for machining the second side surface of the other of the adjacent teeth facing the tooth bottom.

The machining control portion 102 controls the main spindle motor 41 to rotate the machining tool 42 and controls the X-axis motor 11c, Z-axis motor 12c, Y-axis motor 23c, A-axis motor 61 and C-axis motor 62 to relatively move the workpiece W and the machining tool 42 along the X-axis and Z-axis, Y axis, and about A-axis and C-axis respectively, thereby to perform cutting work of the workpiece W. In other words, when a helical gear is formed on an outer peripheral surface of a cylindrical workpiece W, the machining control portion 102 controls to rotate the machining tool 42 and the workpiece W in synchronization with each other in the same direction in response to a ratio of the number of teeth of a gear, keeping each tool state of the machining tool 42 relative to the workpiece W memorized by the tooth bottom tool state memorizing portion 103a and the side surface tool state memorizing portion 103b. Then, by feeding the machining tool 42 in a rotation C-axis (axis shown with "Lw" in FIG. 4B, etc.) direction of the workpiece W and by rotating in response to the helical angle of the helical gear with feeding in the rotation C-axis direction, the axial center distance between the rotation axis "Lw" of the workpiece W and the rotation axis L of the end surface 42A of the machining tool 42 (See FIG. 4B, the rotation axis L of the end surface 42A of the machining tool 42 will be hereinafter referred to as "machining tool axis L") is gradually shortened to perform machining of the machining tool 42. According to this cutting (machining), first, the tooth bottoms between the teeth of the gear are machined, then the first side surfaces of the teeth of the gear are machined and then finally the second side surfaces of the teeth of the gear are machined. This machining may be applicable to the machining of inner teeth on an inner peripheral surface of the cylindrical workpiece W, as well.

(Machining Tool)

According to the gear machining device 1 above, gear teeth are formed by rotating the machining tool 42 and the workpiece W with a high speed in synchronization with each other, feeding the machining tool 42 in the rotation axis direction of the workpiece W to perform a cutting work. As shown in FIG. 10A, according to a conventional cutting method by the gear machining device 1, upon cutting work, a machining tool 420 is used which has a plurality of blades 420a having an equal distance separated from one another, having the same profile with the tooth "g" of a gear G to be machined (as shown in FIG. 13). As shown in FIG. 11, portions of each blade 420a is classified into two types regarding to the contact position with the workpiece W, wherein one type portion of the blade 420a is in contact with the workpiece W at approximately the entire length of the blade 420a ("A" area enclosed by a one-dot chain line) and the other type portion is in contact with the workpiece W at an edge of the blade 420a ("B" area enclosed by a two-dot chain line).

Further, as shown in FIG. 12, the amount of depth of out relative to the workpiece W given to the blade 420a of the machining tool 420 is larger in the case of contact with the workpiece W at the edge of the blade 420a than in the case of contact with the workpiece W at approximately the entire length of the blade 420a. In other words, the cutting resistance generated by the contact with the workpiece W at the edge of the blade 420a becomes larger than the cutting resistance generated by the contact with the workpiece W at approximately the entire length of the blade 420a. Accordingly, the self-induced vibration is easily generated upon cutting work and the tooth trace accuracy (tooth waviness), i.e., as shown in FIG. 13, the average value of surface roughness (tooth trace error) at the both side surfaces "sr" and "sl" in a peripheral direction d1 of the tooth "g" of the gear G, averaged in an axial direction may be worsened.

Further, as shown in FIG. 10B, the outer diameter of the blade tip surface of each blade 420a of the machining tool 420 is smaller at the base end side of the machining tool 420. In other words, the blade tip surface of each blade 420a has a front relief angle p and further, the blade width between the side surfaces 420b of each blade 420a of the machining tool 420 is smaller at the base end side of the machining tool 420. In other words, the side surfaces 420b of each blade 420a have side relief angle (not shown). It is noted however, since the side relief angle is very small compared to the front relief angle, i.e., since the side surfaces 420b of the blade 420a have the shape with small inclination angle relative to the machining tool axis L, the clearance between the side surfaces 420b and the workpiece W becomes small during the cutting of the workpiece, and when the blade 420a is deformed due to the cutting resistance, the side surfaces may easily interfere with the workpiece W. Thus, the accuracy of tooth trace may be further worsened.

Figure 3A:
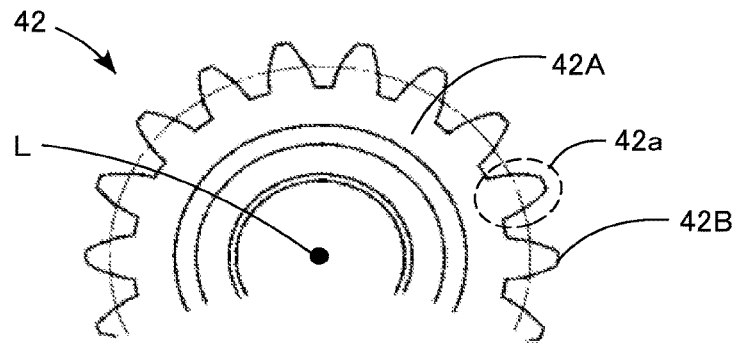
FIG. 3A is a view of the outline structure of the machining tool seen in a direction of rotation axis thereof from the tool end surface side.
Figure 3B:
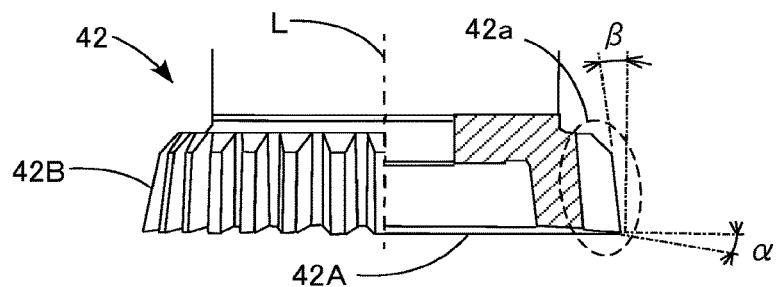
FIG. 3B is a partial sectional view of the outline structure of the machining tool shown in FIG. 3A seen in a radial direction.
Figure 3C:
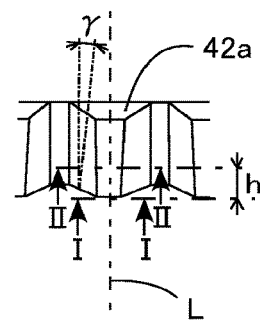
FIG. 3C is an enlarged view of a blade of the machining tool shown in FIG. 3B.

Accordingly, upon the cutting work by the gear machining device 1 according to the embodiment of the invention, as shown in FIG. 3A, a machining tool 42 is used which has a plurality of blades 42a, each having a tooth width smaller than the tooth width of the gear to be machined and each being arranged with an equal pitch (distance) separated from one another. The profile of the machining tool 42 seen from the machining tool axis L is formed to be the same profile with the tooth to mesh with the gear to be machined, and in this embodiment, formed to be the same involute curved profile. In FIG. 3B, the blade 42a of the machining tool 42 is provided at the tool end surface 42A side with a rake angle "α" inclined relative to a plane perpendicular to the machining tool axis L and is provided at the tool peripheral surface 42B side with a front (normal) relief angle "β" inclined relative to the straight line parallel with the machining tool axis L. Further, as shown in FIG. 3, a side relief angle "γ" inclined relative to the straight line parallel with the machining tool axis L is provided at the side surface side of the blade 42a. In other words, the tooth width of the blade 42a is formed to become smaller towards the base end side of the machining tool 42.

Figure 3D:
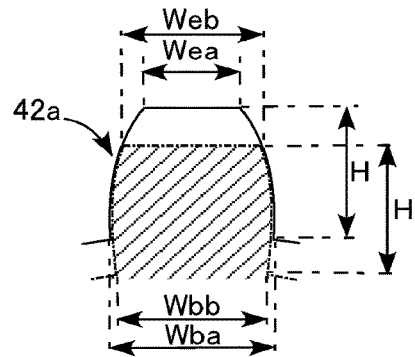
FIG. 3D is a cross sectional view taken from the arrow lines I-I and II-II in FIG. 3C.

In other words, as shown in FIG. 3D, the profile of the tool end surface (profile seen from arrow line I-I direction in FIG. 3C) indicated with the solid line which shows the blade 42a of the machining tool 42 seen from the end surface 42A side in the machining tool axis L direction is formed such that an involute curved profile and the height (H) of the tooth are fixed and the blade tip width Wea is narrower than width Web at position "h" and the blade bottom width Wba is wider than width Wbb at position "h", compared with the cross-sectional profile (seen from arrow line B-B direction in FIG. 3C) indicated with the one dot chain line which shows the blade 42a of the machining tool 42, for example, seen from a direction perpendicular to the tool axis line L at a position "h" from the end surface 42A in the machining tool axis line L. The profile of the blade 42a of the machining tool 42 is similar in shape to the profile of the blade 420a of the machining tool 420 used upon a conventional cutting work as explained above. However, the difference from the conventional blade 420a is that the blade tip widths Wea and Web and the blade bottom widths Wba and Wbb of the blade 41a of the machining tool 42 according to the embodiment of the invention used upon cutting work are formed to be smaller than the corresponding tooth widths of the gear to be machined.

Figure 4A:
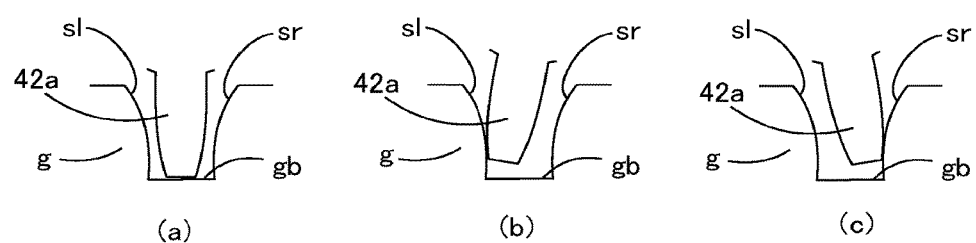
FIG. 4A is a view showing each tool state (a), (b) and (c) of the blade of the machining tool when a tooth bottom, left side surface and right side surface of the adjacent teeth of the gear is respectively machined by the gear machining device shown in FIG. 1A.

Further, as shown in FIG. 4A, the control device 100 controls to machine different portions of the tooth "g" of the gear G, sequentially. In other words, under the control of the control device 100, the tooth bottom "gb" of the tooth "g" of the gear G is machined as indicated in the step (a) of FIG. 4A, next, the first side surface "sl" (in the drawing, the left side surface) of the tooth "g" is machined as indicated in the step (b) of FIG. 4A and finally the second side surface "sr" (in the drawing, the right side surface) of the tooth "g" is machined as indicated in the step (c) of FIG. 4A. It is noted that the sequence may be changed, for example, such that the first side surface "sl" may be machined after the machining of the second side surface "sr". According to this control of machining, the blade 42a of the machining tool 42 cuts a portion of the tooth "g" of the gear G and thereby the cutting resistance can be reduced which suppresses the generation of self-induced vibrations so that the accuracy (reduction of waviness) of the tooth trace of the gear G can be improved.

The control device 100 controls to set the position or the like of the machining tool 42 to respective tool states memorized in advance for the respective machining of tooth bottom, left side surface and the right side surface of the tooth "g", i.e., to the tool position in the axial direction of the tool axis L of the machining tool 42 (hereinafter referred to as "axial direction position of the machining tool 42") and the intersecting angle which is a difference of angle between the helical angle of the tooth "g" of the gear G to be machined and the helical angle of the blade 42a of the machining tool 42 (hereinafter referred to as "intersecting angle of the machining tool 42"). It is noted that in addition to the above tool states, a circumferential position of the machining tool relative to the workpiece W around the rotation axis Lw of the workpiece W may be the subject of the tool state. The control device 100, upon machining a gear, changes at least one of the axial direction position of the machining tool 42 and the circumferential position of the machining tool 42 relative to the workpiece W around the rotation axis Lw of the workpiece W.

Figure 4B:
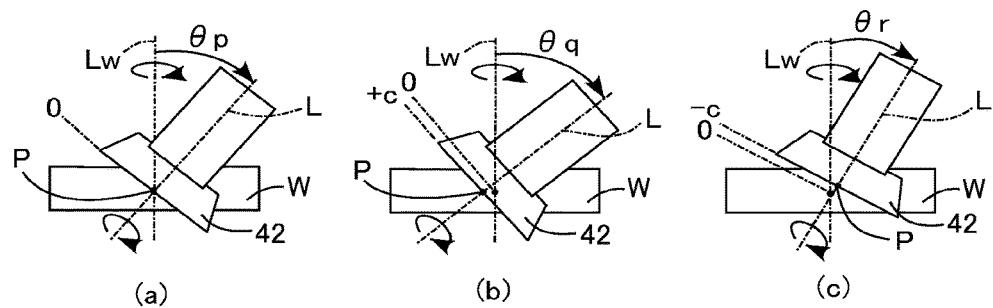
FIG. 4B is a view showing each relative positions (a), (b) and (c) between the workpiece and the machining tool when tooth bottoms, left side surfaces and right side surfaces of the teeth of the gear are machined by the gear machining device shown in FIG. 1A.

In other words, in the tooth bottom machining, the control device 100 changes the position or the like of the machining tool 42, as shown in the step (a) of FIG. 4B so that the axial direction position of the machining tool 42 is not off-set, that is to say, the intersecting point P between the tool end surface 42A of the machining tool 42 and the tool axis L is located on the rotation axis Lw of the workpiece W (zero (0) off-set amount) and that the intersecting angle of the machining tool 42 becomes the angle θp. In the left side (first side) surface machining, the control device 100 changes the position or the like of the machining tool 42, as shown in the step (b) of FIG. 4B, so that the axial direction position of the machining tool 42 is off-set by a distance "+c" in the tool axis L direction of the machining tool 42 (off-set amount "+c") and that the intersecting angle of the machining tool 42 becomes the angle θq.

In the right side (second side) surface machining, the control device 100 changes the position or the like of the machining tool 42, as shown in the step (c) of FIG. 4B, so that the axial direction position of the machining tool 42 is off-set by a distance "−c" in the tool axis L direction of the machining tool 42 (off-set amount "−c") and that the intersecting angle of the machining tool 42 becomes the angle θr. However, since the profile of the blade 42a of the machining tool 42 includes an profile error relative to the designed value, it is possible that the machining state may be worsened, i.e., an error in profile of the machined tooth becomes large, even when the tool state of the machining tool 42 relative to the workpiece W is set to the tool state obtained and memorized in advance. Accordingly, the inventors of this application studied how the machining state changes when the tool state is changed.

For example, as shown in FIG. 5A, the workpiece W was machined in three cases, i.e., in a case that the axial direction position of the machining tool 42 is located on the rotation axis Lw of the workpiece W (off-set amount "0"), in a case that the axial direction position of the machining tool 42 is off-set by a distance "+d" in the tool axis L direction of the machining tool 42 (off-set amount "+d") and in a case that the axial direction position of the machining tool 42 is off-set by a distance "−d" in the tool axis L direction of the machining tool 42. The results of machining state of the workpiece W in the three cases are indicated in FIG. 5B, FIG. 5C and FIG. 5D, respectively. It is noted here that the solid line E in the drawings represents a straight line converted from the involute curve of the tooth "g" of the gear in design. The dotted portion "D" indicates the cut and removed area of the workpiece W.

As shown in FIG. 5B, the tooth of gear machined with the off-set amount "0" is machined to have the profile similar to the involute curve in design. However, as shown in FIG. 5C, the tooth machined with the off-set amount "+d" is machined to have the profile deviated from the profile of involute curve in design in a right direction in the drawing (broken line arrow direction), i.e., deviated in a clockwise direction in a pitch circle. As shown in FIG. 5D, the tooth machined with the off-set amount "−d" is machined to have the profile deviated from the profile of involute curve in design in a left direction in the drawing (broken line arrow direction), i.e., deviated in an anticlockwise direction in a pitch circle. Thus, the profile of the tooth of the gear can be displaced in a pitch circle direction by changing the position of the tool axis L direction of the machining tool 42.

Further, as shown in FIG. 6A, the workpiece W was machined under three cases of the intersection angles of the machining tool 42 being θa, θb and θc, wherein the relationship among the values is set to be "θa>θb>θc". The results of machining state of the workpiece W under the three cases are indicated in FIG. 6B, FIG. 6C and FIG. 6D. However, as shown in FIG. 6B, the tooth machined with the intersecting angle "θa" was machined to have the profile similar to the profile of involute curve in design. On the other hand, as shown in FIG. 6C, the tooth of the gear machined with the intersecting angle "θb", the width of the tooth tip was narrowed in a pitch circle direction (solid arrow direction) relative to the involute curve in design and the width of the tooth root was enlarged in the pitch circle direction (solid arrow direction). Further, as shown in FIG. 6D, the tooth of the gear machined with the intersecting angle "θc", the width of the tooth tip was further narrowed in a pitch circle direction (solid arrow direction) relative to the involute curve in design and the width of the tooth root was further enlarged in the pitch circle direction (solid arrow direction). Thus, the profile of the tooth of the gear regarding to the width of the tooth tip in the pitch circle direction and the width of tooth root in the pitch circle direction can be changed by changing the intersecting angle of the machining tool 42.

Further, as shown in FIG. 7A, the workpiece W was machined in a case that the axial direction position of the machining tool 42 is not off-set, that is to say, the intersecting point P between the tool end surface 42A of the machining tool 42 and the tool axis L is located on the rotation axis Lw of the workpiece W (off-set amount "0") and the intersecting angle of the machining tool 42 becomes the angle θa, and in a case that the intersecting point P is off-set in a tool axis L direction by a distance +d (off-set amount "+d") and the intersecting angle of the machining tool 42 is "θb". The results of machining state of the workpiece W in the cases are indicated in FIG. 7B and FIG. 7C.

As shown in FIG. 7B, the tooth of gear machined with the off-set amount "0" and with the intersecting angle of "θa", was machined to have the profile similar to the involute curve in design. However, as shown in FIG. 7C, the tooth machined with the off-set amount "+d" and with the intersecting angle of "θb", was machined to have the profile deviated from the profile of involute curve in design in a right direction in the drawing (broken line arrow direction), i.e., deviated in a clockwise direction in a pitch circle and was machined to have the width of the tooth tip being narrowed in the pitch circle direction (solid arrow direction) and the width of the tooth root being enlarged in the pitch circle direction (solid arrow direction). Accordingly, the profile of the tooth of the gear regarding to the displacement thereof in the pitch circle direction, the width of the tooth tip in the pitch circle direction and the width of tooth root in the pitch circle direction can be changed by changing the axis direction of the machining tool 42 and the intersecting angle of the machining tool 42. As explained above, the control device 100 executes the processing of obtaining the optimum tool state of the machining tool 42 to obtain an excellent machining state for each of the tooth bottom, left side surface and the right side surface machining of the tooth "g". The processing of the control device 100 will be explained hereinafter.

(Processing by Tool State Calculating Portion of Control Device)

Next, the simulation processing of the control device 100 to obtain the optimum tool state of the machining tool 42 for each of machining of the tooth bottoms, left side surfaces and the right side surfaces of the teeth "g", will be explained with reference to FIG. 2. This simulation is performed based on a well-known gear forming theory by calculating the locus of the blade 42a. In other words, this simulation simulates the operation of machining of the tooth of the gear by using the machining tool 42 which has a rotation axis L inclined relative to the rotation axis Lw of the workpiece W and feeding the machining tool 42 in the rotation axis Lw direction relative to the workpiece W, with rotating the machining tool 42 relatively in synchronization with the workpiece W.

Figure 2:
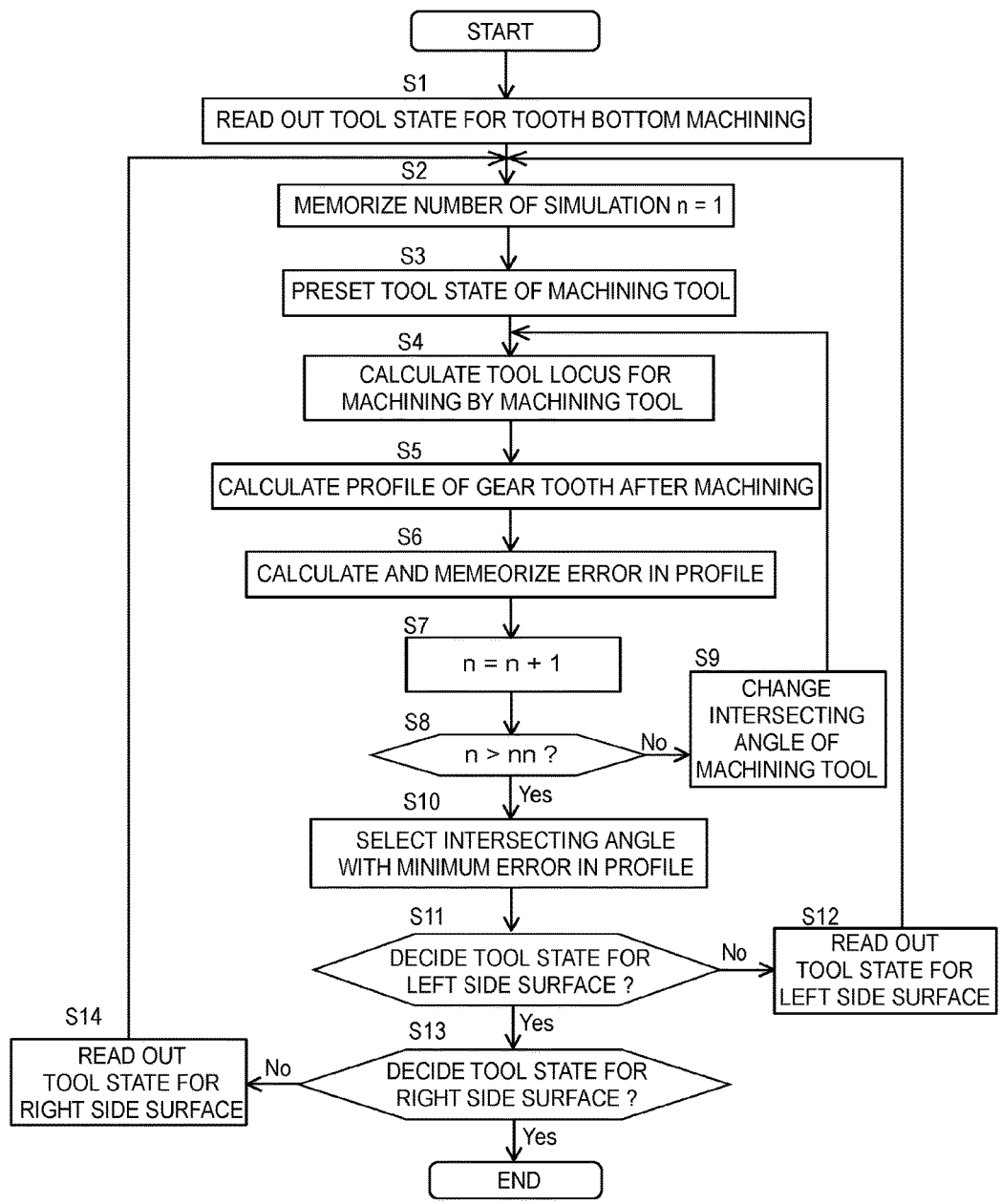
FIG. 2 is a flowchart for explaining the processing of the control device shown in FIG. 1B.

The tooth bottom tool state calculating portion 101a of the control device 100 reads out the tool state of the machining tool 42 memorized in advance for the tooth bottom machining (step S1 of FIG. 2), memorizes that the number (n) of simulation is the first time "1" (step S2 in FIG. 2) and sets a tool state of the machining tool 42 to be the read-out tool state (step S3 in FIG. 2). Then the tooth bottom tool state calculating portion 101a calculates the locus of the tool when the workpiece W is being machined based on the profile of the machining tool 42 memorized in advance (step S4 in FIG. 2) and then calculates the profile of the tooth of the gear after machining (step S5 in FIG. 2). Further, the tooth bottom tool state calculating portion 101a compares the profile of the tooth after machining with the profile of the tooth of the gear in design and calculates the profile error and memorizes the same (step S6 in FIG. 2) then adds one (1) to the simulation number "n" as "n+1" (step S7 in FIG. 2).

The tooth bottom tool state calculating portion 101a judges whether or not the number of simulation "n" has reached to the number "nn" set in advance (step S8 in FIG. 2) and when the tooth bottom tool state calculating portion 101a judges that the number of simulation "n" has not exceeded the set number "nn", the tooth bottom tool state calculating portion 101a changes the intersecting angle of the machining tool 42, which is one of the tool states of the machining tool 42 (step S9 in FIG. 2) and the program returns to the step S4 to repeat the processing above. On the other hand, when the tooth bottom tool state calculating portion 101a judges that the number of simulation "n" has exceeded the set number "nn", the tooth bottom tool state calculating portion 101a selects the intersecting angle with the minimum error among the plurality of memorized intersecting angles with various profile errors (step S10 in FIG. 2). Thus, by the processing above, the tool state including the intersecting angle of the machining tool 42 which is the optimum intersecting angle for tooth bottom machining. Then, the tooth bottom tool state calculating portion 101a memorizes the tool state of the machining tool 42 for tooth bottom machining in the tooth bottom tool state memorizing portion 103a.

The side surface tool state calculating portion 101b judges whether or not the optimum intersecting angle (tool state) of the machining tool 42 for the left side surface machining is decided (step S11 in FIG. 2) and when the side surface tool state calculating portion 101b judges that the tool state for the left side surface machining has not been decided, the side surface tool state calculating portion 101b reads out the tool state of the machining tool 42 memorized in advance for left side surface machining (step S12 in FIG. 2) and the program returns to the step S2 to repeat the processing above. Then, the side surface tool state calculating portion 101b memorizes the tool state of the machining tool 42 for the left side surface machining in the side surface tool state memorizing portion 103b.

On the other hand at the step S11, when the side surface tool state calculating portion 101b judges that the tool state for left side surface machining has been decided, the side surface tool state calculating portion 101b judges whether or not the optimum tool state of the machining tool 42 for the right side surface machining is decided (step S13 in FIG. 2) and when the side surface tool state calculating portion 101b judges that the tool state for the right side surface machining has not been decided, the side surface tool state calculating portion 101b reads out the tool state of the machining tool 42 memorized in advance for right side surface machining (step S14 in FIG. 2) and the program returns to the step S2 to repeat the processing above. Then, the side surface tool state calculating portion 101b memorizes the tool state of the machining tool 42 for the right side surface machining in the side surface tool state memorizing portion 103b. On the other hand, when the side surface tool state calculating portion 101b judges that the tool state for the right side surface machining has been decided, the entire processing ends.

It is noted that instead of changing the intersecting angle of the machining tool 42 at the step S9, changing the axial direction position of the machining tool 42, changing the circumferential position of the machining tool 42 relative to the workpiece W around the rotation axis of the workpiece W, or any combination of changing the intersecting angle, the axial direction position and the circumferential position of the machining tool 42 can be acceptable for achieving the invention. According to the embodiment above, the minimum error intersecting angle is selected by performing a plurality of simulations. However, by setting in advance the allowable profile error, the intersecting angle can be selected when the profile error calculated at the step S6 becomes equal to or less than the set allowable profile error.

According to the gear machining device 1 of the embodiment, since the tooth bottoms, the first side surfaces and the second side surfaces of the teeth "g" of the gear "G" can be machined separately in sequence, the blade 42a of the machining tool 42 is used for cutting a portion of the tooth "g". This can reduce the cutting resistance and accordingly, the generation of the self-induced vibrations to thereby improve the tooth trace accuracy (reduction of waviness of the tooth trace).

Further, since the tooth bottom tool state calculating portion 101a and the side surface tool state calculating portion 101b calculate the tool states of the machining tool 42 which includes at least one of the axial direction position of the machining tool 42, the circumferential position of the machining tool 42 relative to the workpiece W around the rotation axis of the workpiece W and intersecting angle of the machining tool 42, or any combination of the above three, high precision gear can be formed. Further, since the tooth bottom tool state calculating portion 101a and the side surface tool state calculating portion 101b calculate the tool states by simulation and no actual machining is necessary and accordingly the gear manufacturing cost can be reduced.

(Another Processing by Tool State Calculating portion of Control Device)

When an edge of the blade 41a of the machining tool 42 is worn out, the worn blade 42a is re-used by grinding the worn portion of the blade 42a of the machining tool 42. However, since the machining tool 42 is provided with a front relief angle "β", the end surface profile of the blade 42a of the machining tool 42 becomes different before and after the grinding. In other words, when the amount of grinding of the blade 42a reaches to the amount "h", as shown in FIG. 3D, the width "Web" of the tip of the blade 42a of the machining tool 42 increases compared to the width "Wea" before grinding and the machining accuracy of the workpiece W decreases. Even in such case, the control device 100 executes the processing according to the embodiment based on the state of grinding of the blade 42a of the machining tool 42 and decides the optimum tool states of the machining tool 42 to be able to perform a highly accurate machining.

In other words, the tool state calculating portion 101 calculates the tool states of the machining tool 42 based on the grinding state of the worn blade 42a of the machining tool 42. The tool state calculating portion 101 calculates the tool states before grinding of the blade 42a and the tool states after grinding, every time when the grinding is performed. The tool states of the blade 42a before the grinding can be obtained by simulation explained above.

In other words, the control device 100 performs the machining of the workpiece W under the tool states of the machining tool 42 in response to the grinding state of the blade 42a of the machining tool 42. As the specific method for changing the tool states, changing the axial direction position of the machining tool 42, changing the circumferential position of the machining tool 42 relative to the workpiece W around the rotation axis Lw of the workpiece W, changing the intersecting angle of the machining tool 42 or any combination of these changes are considered. By this processing, the workpiece can be precisely machined.

Hereinafter the simulation processing by the tool state calculating portion 101 of the control device 100 for obtaining the intersecting angles of the machining tool 42 as the optimum tool states when the blade 42a of the machining tool 42 is ground, will be explained with reference to FIG. 8. The flowchart in FIG. 8 is different from the flowchart in FIG. 2, in the point that the steps S01 through S03 are added before the step S1 of the flowchart in FIG. 2 and therefore the same steps with those in the flowchart in FIG. 2 will be omitted from the explanation, only referencing the same step numerals.

The tooth bottom tool state calculating portion 101a and the side surface tool state calculating portion 101b of the control device 100 judge whether the machining tool is before the grinding thereof or after the grinding (Step S01 in FIG. 8). If the machining tool is not after the grinding, the tool state calculating portions 101a and 101b read out the profile of the machining tool 42 before the grinding which has been designed and memorized in advance (Step S02 in FIG. 8). On the other hand, if the machining tool 42 has been ground (the machining tool is after the grinding), the tool state calculating portions 101a and 101b calculate a profile of a tool end surface of the machining tool 42 after the grinding in response to a set amount to be removed by grinding of blades 42a (Step S03 in FIG. 8).

Then, the tool state calculating portions 101a and 101b execute the processing from the step S1 as explained according to the flowchart in FIG. 2. At the step S1 in FIG. 8, the tooth bottom tool state calculating portion 101a reads out the tool state including the intersecting angle of the machining tool 42 for tooth bottom machining in response to the grinding state. Further, in FIG. 8, at the steps S12 and S14, the side surface tool state calculating portion 101b reads out the tool states including the intersecting angles of the machining tool 42 for side surface machining in response to the grinding state. Before the grinding, the tool states that are read out here are the tool states including the intersecting angles memorized in advance and after the grinding, the tool states that are read out here are the tool states including the intersecting angles which has been selected immediately before the grinding.

Accordingly, at the steps S2 through S10 in FIG. 8, the processing is executed for both cases, before and after the grinding. In other words, at the step S10 in FIG. 8, the tooth bottom tool state calculating portion 101a obtains the optimum tool state of the machining tool 42 for machining the tooth bottom before the grinding, and at the same time obtains the optimum tool state of the machining tool 42 after the grinding every time the grinding is performed. Similarly, the side surface tool state calculating portion 101b obtains the optimum tool states of the machining tool 42 for machining the first and second side surfaces before the grinding, and at the same time obtains the optimum tool states of the machining tool 42 after the grinding every time the grinding is performed.

It is noted that instead of changing the intersecting angle of the machining tool 42 at the step S9, changing the axial direction position of the machining tool 42, changing the circumferential position of the machining tool 42 relative to the workpiece W around the rotation axis Lw, changing the intersecting angle of the machining tool 42 or any combination of these changes can be considered. According to the embodiment above, the minimum error intersecting angle is selected by performing a plurality of simulations. However, by setting in advance the allowable profile error, the intersecting angle can be selected when the profile error calculated at the step S6 becomes equal to or less than the set allowable profile error.

The above simulation processing is performed every time a grinding of the blades 42a is performed. Accordingly, the machining accuracy can be maintained even the number of grinding time is increased because the optimum tool states of the machining tool 42 can be obtained every time after the grinding is performed. For example, in FIGS. 9A and 9B, the bold solid line E in the drawings indicates the straight line converted from the involute curve of the tooth "g" of the gear G in design, which is as same as the line E shown in FIGS. 5C through 5D. The dotted area D indicates the cut and removed area of the workpiece W. As shown in FIG. 9A, conventionally, the profile of the tooth "g" of the gear after machining used to be within the allowable profile error relative to the profile of the tooth of the gear in design and the machining tool 42 could be used up to the fourth grinding time. However, when the number of grinding time becomes equal to or more than five (5), the profile of the tooth "g" of the gear after machining exceeds the allowable profile error relative to the profile of the tooth of the gear in design and the machining tool 42 could not be used. However, according to this embodiment of the invention as shown in FIG. 9B, even when the number of grinding time reached to six (6), the profile of the tooth "g" of the gear after machining stays in the allowable profile error range relative to the profile of tooth in design. Therefore, the machining tool 42 can be still used which leads to improvement in life durability of the machining tool 42 and eventually this can lead to the production of the gear with high precision and low in cost.

(Others)

According to the embodiments as explained above, although the simulation processing is made respectively for each machining of tooth bottoms, one side surfaces and the other side surfaces of the teeth of the gear, the simulation processing for the tooth bottom machining may be omitted because of the smallness of the machining error therefor (negligible range error) and accordingly, the simulation processing may be made respectively only for each machining of the one side surface and the other side surface of the tooth of the gear. Further, according to the embodiments above, although the machining tool 42 is explained as a tool without torsion angle, the machining tool 42 with torsion angle may be used to achieve the invention. Still further, the gear machining device 1, which is indicated as a five-axis machining center in the embodiment, allows the rotation of the workpiece W about the A-axis. However, a vertical machining center may be used as the five-axis machining center which allows the rotation of the machining tool 42 about the A-axis. Still further, although the gear machining device 1 is explained for the application to the machining centers in the embodiments, similarly, a machining device specialized for the gear machining can be applicable.

Obviously, numerous modifications and variations of the present invention are possible in light of the above teachings. It is therefore to be understood that within the scope of the appended claims, the present invention may be practiced otherwise than as specifically described herein.

The invention claimed is:

1. A gear machining device for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece, the gear machining device comprising:

a tool state memorizing portion for memorizing tool states each including a position or a posture of the machining tool relative to the workpiece and obtained based on a profile of the machining tool, which includes a tooth bottom tool state memorizing portion for memorizing a tooth bottom tool state for machining the tooth bottom between adjacent teeth of the gear, a first side surface tool state memorizing portion for memorizing a first side surface tool state of the machining tool for machining a first side surface of one of the adjacent teeth facing the tooth bottom and a second side surface tool state memorizing portion for memorizing a second side surface tool state of the machining tool for machining a second side surface of the other of the adjacent teeth facing the tooth bottom; and a machining control portion for controlling machining of the tooth bottoms, the first side surfaces and the second side surfaces under respective tool states of the machining tool memorized in the tooth bottom tool state memorizing portion, the first side surface tool state memorizing portion and the second side surface tool state memorizing portion.

2. The gear machining device according to claim 1, wherein the tooth bottom tool state memorizing portion, the first side surface tool state memorizing portion and the second side surface tool state memorizing portion memorize respective intersecting angle which is an inclination angle of a rotation axis of a tool end surface of the machining tool relative to the rotation axis of the workpiece, as the tooth bottom tool state, the first side surface tool state and the second side surface tool state.

3. The gear machining device according to claim 1, wherein the tooth bottom tool state memorizing portion, the first side surface tool state memorizing portion and the second side surface tool state memorizing portion memorize at least one of a position of the tool end surface of the machining tool in a rotation axis direction thereof and a circumferential position of the machining tool relative to the workpiece around the rotation axis of the workpiece, as the tool state.

4. The gear machining device according to claim 1, wherein the first side surface tool state memorizing portion and the second side surface tool state memorizing portion memorize the first and the second side surface tool states respectively which are obtained based on a result calculated by simulation.

5. The gear machining device according to claim 4, wherein the tooth bottom tool state memorizing portion memorizes the tooth bottom tool state which is obtained based on a result calculated by simulation.

6. The gear machining device according to claim 1, wherein a profile of a tool end surface of the machining tool before grinding of blades of the machining tool is different from the profile of the tool end surface of the machining tool after grinding thereof, the tooth bottom tool state memorizing portion memorizes the tooth bottom tool state of the machining tool obtained based on the profile of the tool end surface of the machining tool after the grinding and the first and the second side surface tool state memorizing portions memorize the first and the second side surface tool states of the machining tool respectively obtained based on the profile of the tool end surface of the machining tool after the grinding and wherein, the machining control portion controls machining of the tooth bottoms, the first side surfaces and the second side surfaces, after grinding the blades of the machining tool, under the respective tool states of the machining tool after the grinding, memorized in the tooth bottom tool state memorizing portion, the first side surface tool state memorizing portion and the second side surface tool state memorizing portion, respectively.

7. The gear machining device according to claim 6, wherein the profiles of the end surface of the machining tool before the grinding and after the grinding become different from each other, because the blades are provided with a front relief angle.

8. The gear machining device according to claim 7, wherein the blades of the machining tool have a tooth profile of an involute curve.

9. A gear machining device for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece, wherein a profile of a tool end surface of the machining tool before grinding of blades of the machining tool is different from the profile of the tool end surface of the machining tool after grinding thereof, the gear machining device comprising:

a tool state memorizing portion for memorizing tool states each including a position or a posture of the machining tool relative to the workpiece and obtained based on profiles of the tool end surface of the machining tool before and after the grinding; and a machining control portion which controls machining of the tooth bottoms, the first side surfaces and the second side surfaces before grinding the blades of the machining tool, under respective tool states of the machining tool before the grinding memorized in the tool state memorizing portion and controls machining of the tooth bottoms, the first side surfaces and the second side surfaces after grinding the blades of the machining tool, under the tool states of the machining tool after the grinding memorized in the tool state memorizing portion.

10. A gear machining method for machining tooth bottoms and first and second side surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece, the gear machining method comprising the processes of:

a tooth bottom tool state calculating process for calculating a tooth bottom tool state including a position or a posture of the machining tool relative to the workpiece for machining the tooth bottom between adjacent teeth of the gear;

a first side surface tool state calculating process for calculating a first side surface tool state including a position or a posture of the machining tool relative to the workpiece for machining the first side surface of one of the adjacent teeth facing the tooth bottom;

a second side surface tool state calculating process for calculating a second side surface tool state including a position or a posture of the machining tool relative to the workpiece for machining the second side surface of the other of the adjacent teeth facing the tooth bottom; and a machining controlling process for controlling machining of the tooth bottoms, the first side surfaces and the second side surfaces under the respective tool states of the machining tool calculated in the tooth bottom tool state calculating process, the first side surface tool state calculating process and the second side surface tool state calculating process, respectively.

11. A gear machining method for machining tooth bottoms and first and second surfaces of teeth of a gear by using a machining tool which has a rotation axis inclined relative to a rotation axis of a workpiece and feeding the machining tool relatively in a rotation axis direction of the workpiece by rotating the machining tool in synchronization with a rotation of the workpiece, wherein a profile of a tool end surface of the machining tool before grinding of blades of the machining tool is different from a profile of the tool end surface of the machining tool after grinding thereof, the gear machining method comprising the processes of:

a tooth bottom tool state calculating process for calculating a tooth bottom tool state including a position or a posture of the machining tool relative to the workpiece for machining the tooth bottom between adjacent teeth of the gear based on the respective profiles of the tool end surface of the machining tool before and after the grinding;

a first side surface tool state calculating process for calculating a first side surface tool state including a position or a posture of the machining tool relative to the workpiece for machining the first side surface of one of the adjacent teeth facing the tooth bottom based on the respective profiles of the tool end surface of the machining tool before and after the grinding;

a second side surface tool state calculating process for calculating a second side surface tool state including a position or a posture of the machining tool relative to the workpiece for machining the second side surface of the other of the adjacent teeth facing the tooth bottom based on the respective profiles of the tool end surface of the machining tool before and after the grinding; and a machining controlling process for controlling machining of the tooth bottoms, the first side surfaces and the second side surfaces before grinding the blades of the machining tool, under the respective tool states of the machining tool calculated based on the profile of the tool end surface of the machining tool before the grinding in the tooth bottom tool state calculating process, the first side surface tool state calculating process and the second side surface tool state calculating process, and for controlling machining of the tooth bottoms, the first side surfaces and the second side surfaces after grinding the blades of the machining tool, under the respective tool states of the machining tool calculated based on the profile of the tool end surface of the machining tool after the grinding in the tooth bottom tool state calculating process, the first side surface tool state calculating process and the second side surface tool state calculating process.

* * * * *